United States Patent [19]

Hyziak et al.

[11] Patent Number: 5,682,460
[45] Date of Patent: Oct. 28, 1997

[54] METHOD FOR SELECTING TRANSMISSION PREFERENCES

[75] Inventors: Janusz Hyziak, Des Plaines; Valentin Oprescu-Surcobe, Northbrook; Steven M. Smith, Hoffman Estates; Scott A. Zabolotzky, Addison, all of Ill.

[73] Assignee: Motorola, Inc., Schaumburg, Ill.

[21] Appl. No.: 298,477

[22] Filed: Aug. 29, 1994

[51] Int. Cl.$^6$ .................................................. G06F 17/30
[52] U.S. Cl. ........................ 395/600; 395/200; 395/575; 395/700; 379/59; 379/89
[58] Field of Search .......................... 395/600, 575, 395/200, 700

[56] References Cited

U.S. PATENT DOCUMENTS

| | | | |
|---|---|---|---|
| 4,191,860 | 3/1980 | Weber | 379/115 |
| 4,817,036 | 3/1989 | Millett et al. | 395/600 |
| 5,051,720 | 9/1991 | Kittirutsunetorn | 340/310 |
| 5,109,405 | 4/1992 | Morganstein | 379/89 |
| 5,136,636 | 8/1992 | Wegrzynowicz | 379/207 |
| 5,285,494 | 2/1994 | Sprecher et al. | 397/59 |
| 5,349,678 | 9/1994 | Morris et al. | 395/800 |
| 5,408,237 | 4/1995 | Patterson et al. | 342/354 |

*Primary Examiner*—Thomas G. Black
*Assistant Examiner*—Cheryl Lewis
*Attorney, Agent, or Firm*—Val Jean Hillman

[57] ABSTRACT

In a communication system a method for selecting a set of preferences for use during transmission of information to a particular destination anticipates selecting a list of one or more destinations, each destination having a key and a set of preferences, each preference further having a value. A historical database is indexed via the key to retrieve a set of database entries, each entry having a set of preferences, each preference further having a value. The retrieved database entries are filtered in order to identify those entries exhibiting a predefined set of criteria. After filtering, the preference values within the identified database entries are applied during transmission and subsequent processing of the information.

10 Claims, 4 Drawing Sheets

| NAME | ADDRESS | PREFERENCE | MSG. ID | MSG. TYPE | STATUS | BODY |
|------|---------|------------|---------|-----------|--------|------|
|      |         |            |         |           |        |      |
|      |         |            |         |           |        |      |
|      |         |            |         |           |        |      |
|      |         |            |         |           |        |      |
|      |         |            |         |           |        |      |
|      |         |            |         |           |        |      |

| NAME | # OF CRITERIA | CRITERIA CODE | VALUE | LOGIC FUNCTION | ... | CRITERIA CODE | VALUE | LOGIC FUNCTION |
|------|---------------|---------------|-------|----------------|-----|---------------|-------|----------------|
| 702  | 704           | 706           | 708   | 710            |     | 706           | 708   | 710            |
|      |               |               |       |                |     |               |       |                |
|      |               |               |       |                |     |               |       |                |
|      |               |               |       |                |     |               |       |                |
|      |               |               |       |                |     |               |       |                |

METHOD FOR SELECTING TRANSMISSION PREFERENCES

FIELD OF THE INVENTION

This invention relates generally to the field of data communication and more particularly to a method for selecting a set of preferences to be used during the transmission of information.

BACKGROUND OF THE INVENTION

In today's fast paced business environment, individuals on-the-go, often need to transmit information such as, for example, voice signals, video signals, whether real-time or otherwise, data signals, audio signals, control signals and/or various combinations thereof to a particular recipient or group of recipients. For their communicating needs, these individuals, hereinafter referred to collectively as senders, may employ a plethora of communicating devices such as, for example, personal computers, lap-top computers, notebook computers, radio telephones, facsimile machines, two-way pagers, personal digital assistants (PDAs) and the like.

The information for transmission is typically communicated over a communication channel via electronic message, file, document and/or object. As is known in the field of object-oriented technology, an object is a software package that contains a collection of related program instructions and data.

Endemic to the above described scenario, the sender typically has little or no direct control over the communication process other than designating the intended recipient (s). This basic lack of control is increasingly being perceived as unacceptable. This is especially true for communication systems wherein the information may be communicated to the recipient via more than one integrated communication network. Under such circumstances, issues relating to sender's cost, message security and transmit time, to name a few, all become worthy considerations.

For example, when the sender's information is confidential or sensitive in nature, the sender may desire to route such information to the recipient via a network that employs security measures such as, for example, encryption or authentication. Depending upon message size, the sender may desire to route the information to a recipient over the most economical network. On the other hand, when time is of essence, the sender may desire to route the information over that network exhibiting the highest throughput.

In light of these concerns, it would be extremely advantageous to provide a method for selecting a set of preferences and appropriate constraints to be used during the transmission of information that takes into consideration sender criteria. It would be of greater advantage for said method to consider various forms of feedback such as, for example, past transactions performed by the sender and recent network performance.

SUMMARY OF THE INVENTION

According to the present invention, a method is provided for communicating a message having attributes, said message attributes comprised of header, destination, status and payload information, to destinations within a communication system comprising the steps of: selecting a list of one or more destinations, each destination having a set of preferences, each preference further having a default value; determining a second set of values for at least some of the preferences within said list of one or more destinations; and utilizing at least the second set of preference values during the transmission of the message.

BRIEF DESCRIPTION OF THE DRAWINGS

FIG. 6 depicts the format of a database maintained within memory of a communicating device of FIG. 1; and FIG. 7 depicts the format of a criteria list employed by a communicating device of FIG. 1 in order to filter data within the database depicted in FIG. 6.

DETAILED DESCRIPTION OF A PREFERRED EMBODIMENT

Before describing an embodiment of the present invention, it is believed that an overview will aid in the reader's understanding. The purpose of the present invention is to permit a communication system subscriber to select a set of preferences and associated constraints to be used during the transmission of information within said communication system for reasons such as, but not limited to: cost, security, urgency, reporting options, disposition requests, and/or spectral efficiency. The present invention clearly anticipates that said method will consider feedback such as, for example, past transactions performed by said subscriber and recent network performance in order for said selection process to be made adaptive.

Figure 1:
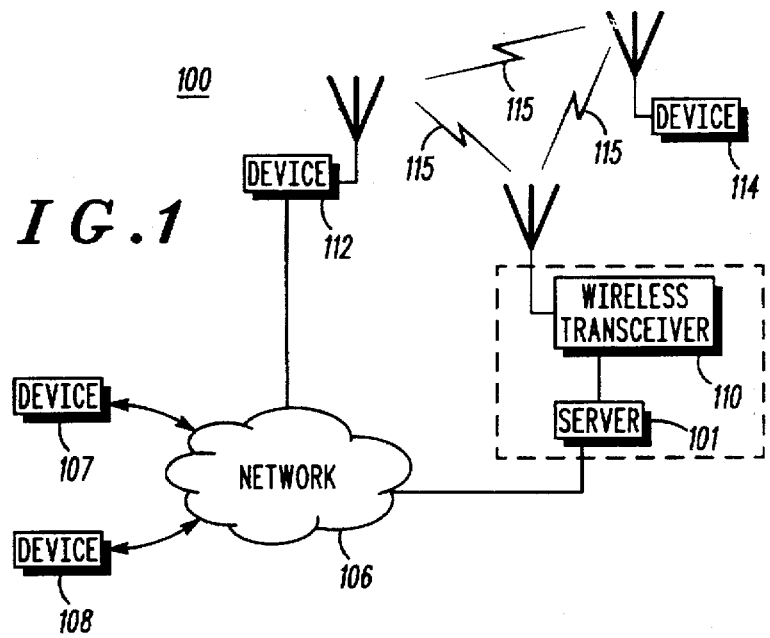
FIG. 1 illustrates in block diagram form a communication system anticipated by the present invention.

FIG. 1 is a block diagram representation of a communication system 100 anticipated by the present invention. As depicted communication system 100 comprises at least a wireline communication network 106 and a wireless communication network 115. System server 101 couples to the wireline network 106 as well as the wireless network 115. As will be appreciated, wireline network 106 may comprise any communications technology capable of facilitating the communication of information to and from server 101 and between devices 107, 108 and 112, such as, for example, the Public Switching Telephone Network (PSTN), an Integrated Services Digital Network (ISDN), a Local Area Network (LAN) or any of a plurality of other publicly accessible and/or privately maintained wireline communication networks as are known in the art.

Returning to FIG. 1, server 101 couples to wireless transceiver 110 which, in accordance with the preferred embodiment, is a radio frequency (RF) modem. Such modems have in the past been available under the brand name EAGLE™ by contacting Motorola Inc. at 1303 East Algonquin Road, Schaumburg, Ill. 60193. It should be appreciated, however, that wireless transceiver 110 may also comprise a multiple-channel transmitting and receiving facility having distributed or centralized channel allocation control. For example, wireless transceiver 110 may comprise a network control processor (NCP) of a Motorola trunked radio system such as the Smartnet™ system. In addition, wireless transceiver 110 may comprise a DYNATAC™ series mobile telephone base station or any of a plurality of other publicly accessible and/or privately maintained radio communication networks such as, for example, ARDIS™ IRIDIUM™, and Meridian™. In the past, information regarding the above-mentioned devices and communication networks has been available by contacting Motorola Inc. at 1303 East Algonquin Road, Schaumburg, Ill. 60193.

While wireless transceiver 110 is described herein as an RF modem or radio, it will be appreciated by those skilled in the art that wireless transceiver 110 may comprise any other wireless communications technology capable of facilitating the communication of information between devices 112 and 114 and to and from server 101 such as, for example, infrared technology.

When configured in accordance with FIG. 1, devices 107 and 108 communicate to each other via network 106 and server 101. In a similar fashion, devices 107 and 108 communicate with devices 112 and 114 via network 106, server 101 and wireless transceiver 110. Device 112 may also communicate with devices 107 and 108 via network 106 and server 101, as facilitated by detachable connector 120. On the other hand, devices 112 and 114 communicate to each other via radio frequency (RF) network 115. In general, devices 107, 108, 112 and 114 comprise personal computers, e.g., lap-tops, desk-tops, palm-tops and notebook computers, facsimile machines, radio telephones, two-way pagers, personal digital assistants (PDAs) and the like.

Figure 2:
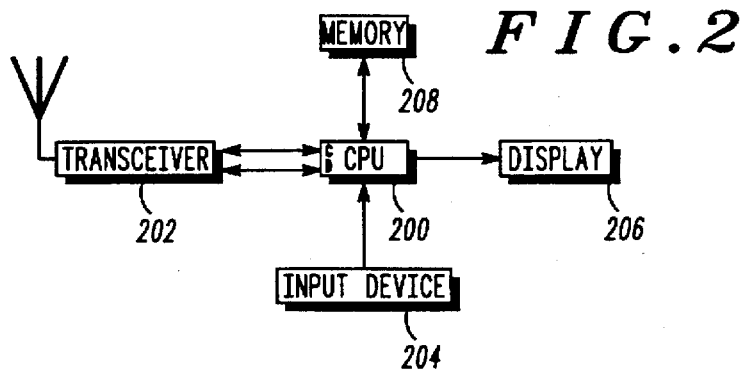
FIG. 2 is a block diagram representation of a structure common to the communicating devices of FIG. 1.

FIG. 2 is a block diagram representation of communications device 114 as shown in FIG. 1. Said device includes a central processing unit (CPU) 200, radio transceiver 202, input device 204, optional display device 206 and memory device 208. CPU 200 employs both control (C) and data (D) links to communicate with radio transceiver 202. Radio transceiver 202 is necessarily compatible with the radio service used by wireless transceiver 110 of FIG. 1. CPU 200 couples to and receives inputs from user input device 204, provides output signals to display device 206 and stores and retrieves information from memory device 208. As will be appreciated, memory device 208 maintains a set of operating program instructions which when performed by CPU 200 controls the operation of device 114.

Input device 204, which enables a device operator to interface with and operate device 114, may comprise any user interface which provides input signals to CPU 200. Such devices typically include, but are not limited to, alphanumeric keyboards, electronic mice, track balls, joysticks, microphones, electronic or light pens, touch screens or any other user input devices capable of providing input signals to CPU 200. Display 206 may comprise any of the available display devices capable of presenting electronic information to the device user in an audio, visual or otherwise perceivable fashion.

For the present invention, it is important to understand that device 114 is a programmable platform that can be programmed to operate in accordance with the teachings of the present invention. It will be further appreciated by those skilled in the art that FIG. 2 is also a representative block diagram for devices 107, 108 and 112. For devices 107 and 108, transceiver 202 will be replaced by a network interface device, as is known in the art, consisting of appropriate registers and line drivers for communicating with network 106. Device 112 employs transceiver 202 as well as a network interface device, as mentioned above, consisting of appropriate registers and line drivers for communicating with network 106.

Figure 3:
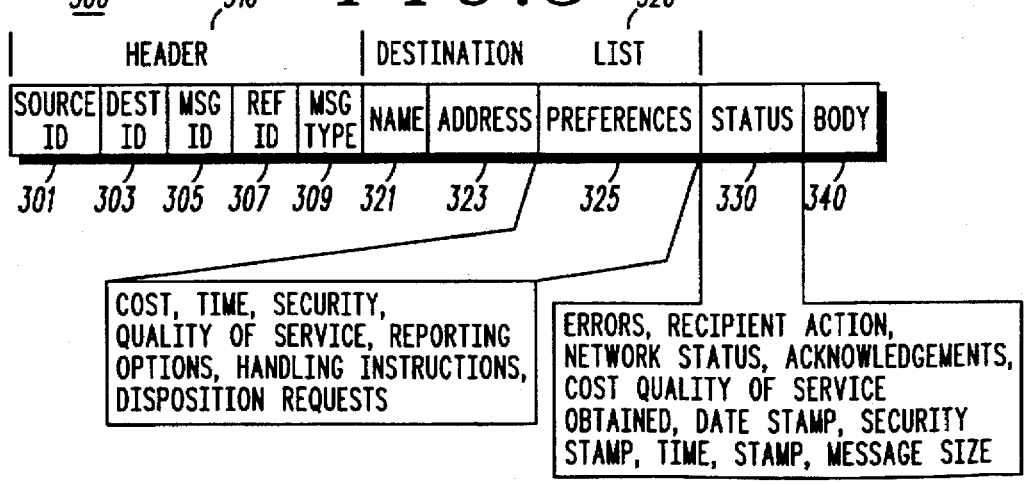
FIG. 3 depicts the structure of a message for use within the communication system of FIG. 1.

FIG. 3 depicts the structure of a message 300 for transmission within communication system 100 of FIG. 1. As depicted each message 300 comprises a header portion 310, destination list 320, status field 330 and body 340. Header 310 typically consists of a Source ID field 301, Destination ID field 303, Message ID field 305, Reference ID field 307 and Message type field 309.

Source ID field 301 contains information identifying a device 107, 108, 112 or 114 that originated the information for transmission. As will be appreciated by those skilled in the art, source ID field 301 may also comprise information that identifies the sender, the individual who actually originated the information.

For peer-to-peer communications, destination ID field 303 contains information which identifies a peer device to which the information is intended. Otherwise, destination ID field 303 contains information which identifies server 101. Preference selection in accordance with the present invention does not entertain peer-to-peer communications thus, destination ID field 303 will typically contain server 101 identification information.

Message ID field 305 is employed to uniquely identify each particular transmission within communication system 100 of FIG. 1. Reference ID field 307 is employed by server 101, recipient devices 107, 108, 112 and/or 114 and the device that originated the transmission to assure proper correlation between recipient device responses and the original transmission.

Message type field 309 contains information which identifies the content of body 340 as voice, data, audio, graphics, video, multi-media, status or control information.

Destination list 320 is a list of one or more selected destinations, that are to receive the information within body 340. Each list entry comprises a destination name 321, destination logical address 323 and set of preferences 325.

As will be described herein below, it is the set of preferences and their associated constraints that permit the sender to selectively and/or adaptively control information delivery. Such preferences typically relate, but are not limited to criteria such as: sender cost, message security, elapsed transmission time, quality of service, reporting options, handling instructions and spectral efficiency, just to name a few.

Cost preference selection permits the sender of a transmission to elect message delivery via a network, for example 106 or 115 of FIG. 1, based upon cost to the sender. Security preference selection permits the sender to select message delivery via a communication network, for example 106 or 115 of FIG. 1, based upon relative levels of security. Elapsed transmission time preference selection permits the sender of a transmission to direct message delivery via the communication network, that exhibits the fastest delivery (i.e., minimum traffic lcad). Quality of service preference selection permits the sender of a transmission to control message delivery via that network that is best suited for the type of information being transmitted based upon network characteristics such as the ability to transmit ASCII or binary information (i.e., 7 bit or 8 bit transmission).

Handling instruction preference selections permit the sender of a transmission to control the action a recipient will take in response to receipt of said message, i.e., recipient replies. For example, handling instructions will typically specify whether the recipient is to read, delete, approve, acknowledge and/or ignore the message. Reporting option preference selection permits the sender of a transmission to monitor and control the occurrence and the level of detail provided during status reporting. For example, reporting option preferences will typically specify whether status is to be reported only on a failure, only on successful delivery, only on acknowledgment, during intermediate transactions such as, for example, message forwarding and/or recipient actions or at every step during delivery. In addition, this preference permits the sender to specify the amount and type of data to be reported at each said reportable occurrence. Status field 330 is used by recipient devices 107, 108, 112, 114 and server 101 to report to the sender of a transmission that status as requested by the senders status reporting preference selections. In addition, status field 330 is used by the sending device to record status information regarding original transmissions. Thus, status field 330 will maintain information regarding actual recorded performance, such as, the time of a transmission (i.e., time stamp), size of a transmission (i.e., number of bytes), type of information transmitted, elapsed time of transmission, number of errors experienced, quality of service, level of security, cost of transmission, as well as recipient replies, such as acknowledgments and whether the message was read, deleted, approved, rejected etc.

Body 340 contains the information selected for transmission. Such information may include, but is not limited to: objects, electronic messages comprising voice, data, audio, video and/or combinations thereof, electronic files and electronic documents. By definition, an object is a software package that contains a collection of related procedures, i.e., program instructions and data. Thus, the transmission of objects per the teaching of object-oriented technology is clearly anticipated by the present invention.

Figure 4:
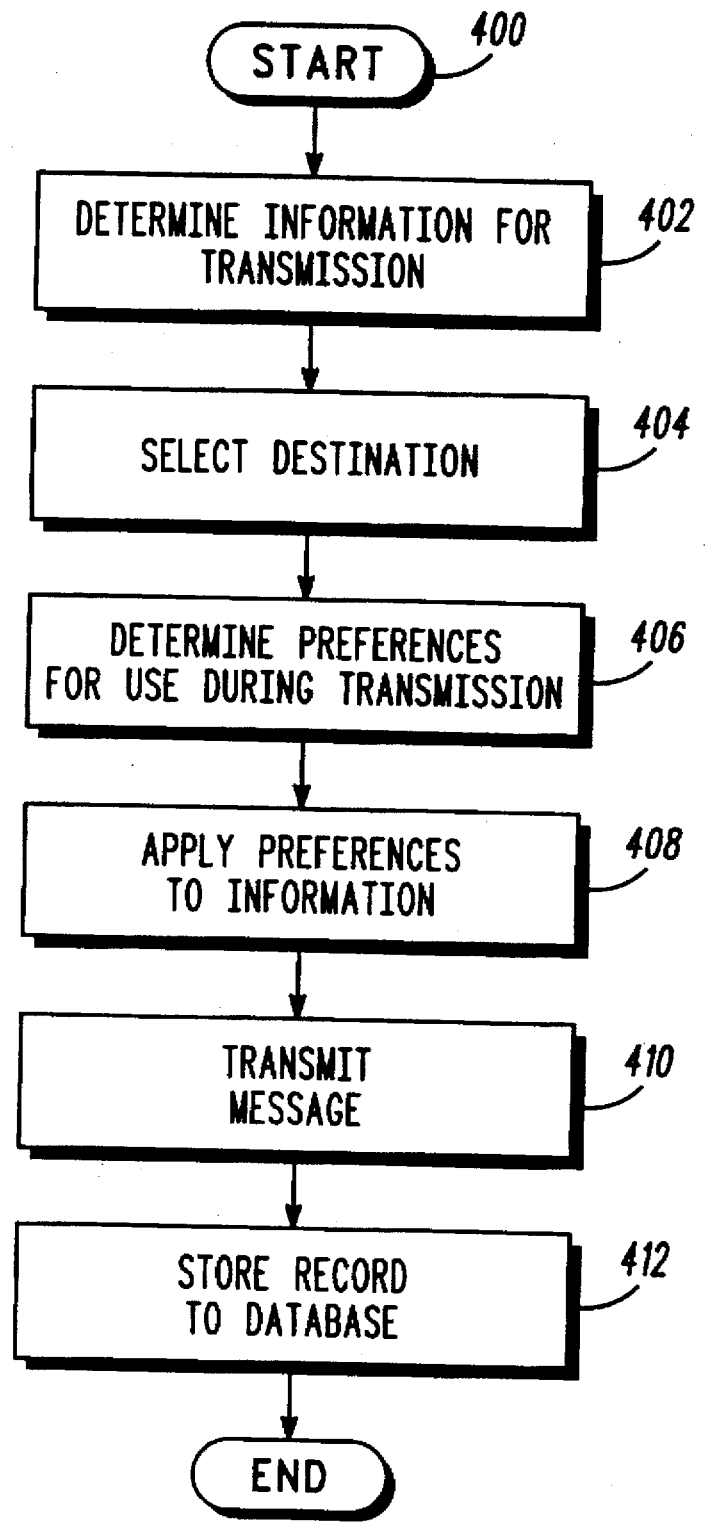
FIG. 4 is a flow chart diagram illustrating the steps performed by the communicating devices of FIG. 1 in order to transmit information in accordance with the present invention.

FIG. 4 is a flow chart diagram illustrating the steps performed by communicating devices 107–114 of FIG. 1 in order to transmit information in accordance with the present invention. Commencing at start block 400, flow proceeds to block 402 where the sender, in conjunction with a device 107–114, determines the information for transmission. As will be appreciated, this information may be created by the sender or may have been previously stored in device 107–114 or in server 101. At step 404, a destination or set of destinations for said information is selected.

Where destinations are selected from an electronic mail program such as, for example, the Microsoft® Mail electronic mail program, the program will typically include an electronic address book, as is known in the art. From such an address book, destination selection may be performed by indexing, marking or otherwise identifying an address book entry or entries as destinations. In the past information on the Microsoft® Mail electronic mail program has been available by contacting Microsoft Corporation at One Microsoft Way, Redmond, Wash. 98052-6399.

Where destinations are selected from, for example, the Internet, a worldwide interconnected collection of networks that predominantly use the TCP/IP protocol suite, selection may be performed by directly utilizing the Internet user's ID or by requesting such information from a directory service such as, for example, the WHOIS directory service database, as is known and well documented in the Internet Community.

Once a list comprising one or more destinations has been compiled, flow proceeds to block 406 where a set of preferences for use during transmission of the information is determined for each destination. As anticipated by the present invention, preference selection may be manually controlled by the sender via input device 204. Typically, the set of individual preferences and associated constraint parameters, as referenced in FIG. 3, will be displayed via display device 206 in association with the destination selection operation of step 404. In response to these visual displays, the sender may change constraint parameters that cause the state of the various preferences to change.

In addition to sender inputs, preference selection may be automated via a set of program instructions used in conjunction with historical data stored in a database 600 like the one depicted in FIG. 6 and described herein below in more detail. It will be appreciated by those skilled in the art that automated preference selection is designed to make the overall operation more efficient as well as user friendly. Notwithstanding automated selection, a device subscriber may still employ manual preference selection to override computed preference selection as taught herein.

From block 406, flow proceeds to block 408 where the information from block 402, destination information as selected at block 404 and the set of preferences, as determined at block 406, are combined to create a message 300. At block 410, message 300 is transmitted to the desired destination(s) and at block 412 a record of the transmitted message is stored to a historical database. As will be appreciated by those skilled in the art, the record may be stored prior to message transmission.

Figure 5:
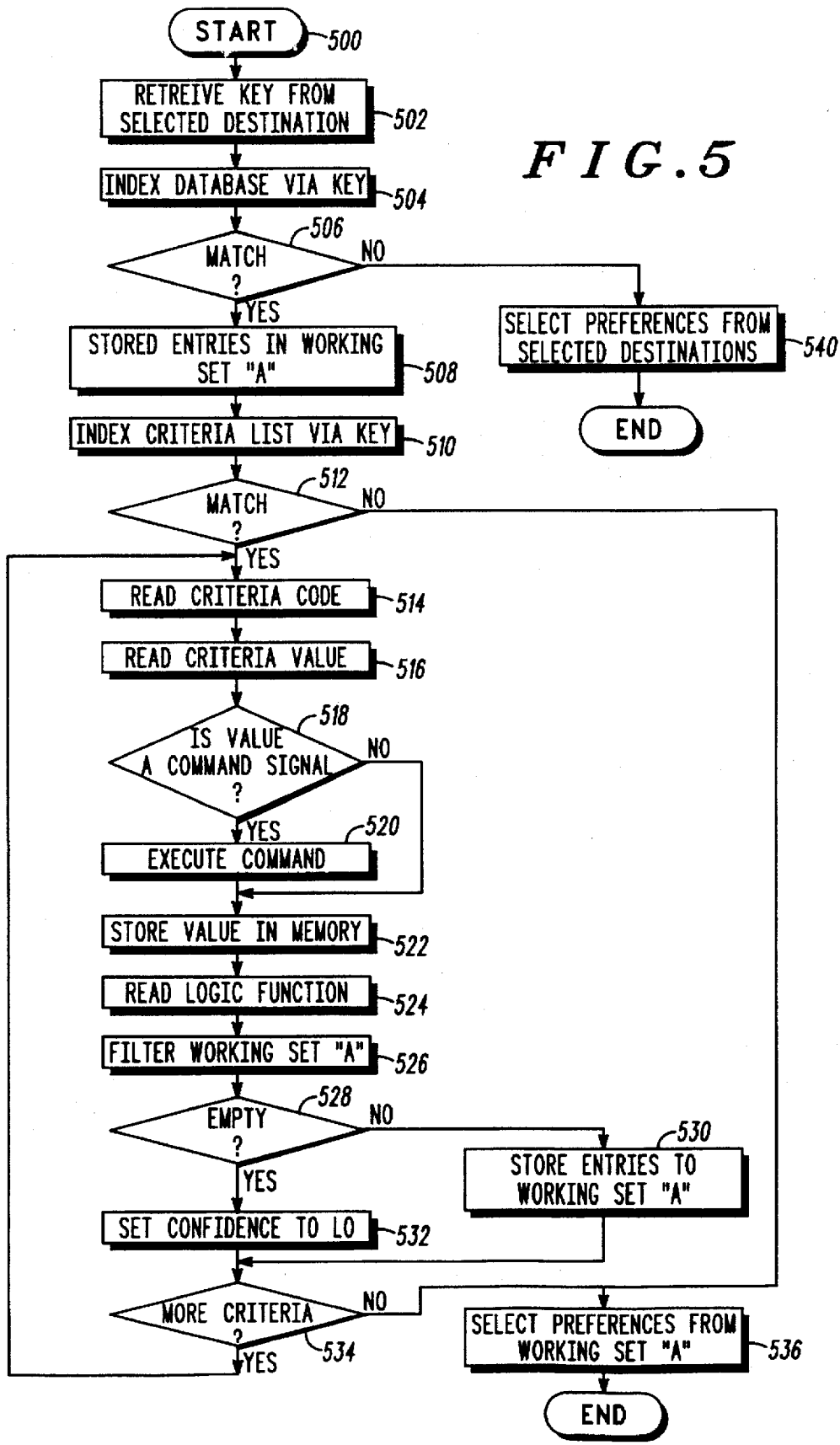
FIG. 5 is a flow chart diagram illustrating the steps performed by the communicating devices of FIG. 1 in order to perform preference constraint selection in accordance with the present invention.

FIG. 5 is a flow chart diagram illustrating the steps performed by communicating devices 107, 108, 112 and 114 of FIG. 1 under the direction and control of a set of operating program instructions stored in device memory, in order to perform adaptive preference selection in accordance with the present invention. Commencing at block 500, flow proceeds to block 502 where a key is retrieved from each selected destination. In accordance with the preferred embodiment, the key will comprise at least a destination name, corresponding to the content of field 321 of FIG. 3. It will be appreciated by those skilled in the art, however, that the key may comprise additional information, such as, for example, destination address 323 and/or Message ID 305 of FIG. 3, to name a few.

From block 502, flow proceeds to block 504 where a historical database 600, like the one depicted in FIG. 6, is indexed via the selected key. As depicted in FIG. 6, historical database 600 comprises several entries, each entry having a field corresponding to a particular message attribute including status regarding past transmissions.

Message attributes typically include all header 310, destination list 320, status 330 and body/payload 340 contents. Pertinent message attributes comprise destination name 321, destination address 323, preferences 325, message ID 305, message type 309, status 330 and body 340. Collectively, the information maintained within historical database 600 provides a history of recent messages transmitted to and from the device in question, including pass/fail status, reporting options, error reports, costs incurred, transmission times, quality of service, security levels, and additional message attributes such as size and type, just to name a few. Based upon this information, future transmission can be efficiently routed by taking into consideration past preference selections as well as network feedback as accumulated within historical database 600.

In accordance with the present invention, historical database 600 is indexed at step 504 via the key (i.e., destination name 321) to retrieve all information stored therein pertaining to past message transmissions to and from the selected destination. From block 504, flow proceeds to block 506 where a check is performed to determine whether any information regarding past message transmissions to and from the selected destination were found. If no such match is found, it is assumed no prior transmissions to or from the selected destination have been performed. In accordance, flow branches to block 540 where the default preferences within the selected destination are used at block 406 of FIG. 4.

Assuming a match is found, flow proceeds to block 508 where the retrieved database information is temporarily stored in memory to a location e.g., working set A.

From block 508, flow proceeds to block 510 where a criteria list 700 of FIG. 7 is indexed via the key, to retrieve a criteria list entry. As depicted in FIG. 7, the list 700 comprises several entries, each entry having a field for destination name 702 and a number of criteria involved 704. Thereafter each entry has repeatable fields for criteria code 706, preference values 708 and logical functions 710. Criteria code field 706 maintains information identifying a single preference. Value field 708 comprises a representation that corresponds to that preference's value or in the alternative, a command signal that causes value field content to be determined from actual message attributes. Logic function field 710 maintains a logic function which is used to filter historical database 600 entries in preparation for preference calculation. In accordance with the present invention, Logic field 710 may comprise, but is not limited to Boolean logic expressions, and fuzzy logic expressions.

At block 512, a check is performed to determine whether a criteria list 700 entry corresponding to the key, was found. As will hereinafter be appreciated, criteria list 700 contents are typically entered by the sender to establish the order and importance of the preferences to be used during message transmission. If no such match is found at block 512, it is assumed that no delivery criteria were entered by the sender for the destination in question. In accordance, no criteria will be applied and flow will branch from block 512 to block 536.

If, on the other hand, a match is found at block 512, flow proceeds to blocks 514 and 516 where the criteria code field 706 and the criteria value field 708 for that entry are read. At block 518 a check is performed to determine whether the criteria value field 708 comprises a value or a command signal. Assuming value field 708 comprises a command, in accordance with the invention, that command, as executed at block 520, will direct that the value field 708 content be derived from actual attributes of the message 300 selected for transmission at step 402 of FIG. 4.

For example, if cost is the preference identified by criteria code field 706 and value field 708 comprises a command signal as opposed to a cost value, at step 520, the cost information as provided within message 300 of step 402 will be used in value field 708. This process permits the preferences to be adapted to specific characteristics of the message to be transmitted. As will be appreciated, criteria list 700 contents are to be entered by the sender, thereby reflecting the order and importance of the preferences to be used during message transmission. Of course, a set of default preferences will be used in the absence of sender input.

From blocks 518 or 520, flow proceeds to block 522 where the value as retrieved from value field 708 or derived at block 520 is stored in memory. Next, the logic function field 710 of list 700 is read at block 524. Proceeding to block 526, Working set A, as determined at block 508, is filtered with the criteria code of block 514, the value field content as stored at block 522 and the logic function read at block 524.

Filtering is accomplished by retrieving from Working set A, those entries having message attributes that correspond to the attribute identified by criteria code 706 of block 514. Thereafter, Logic function 710 may be applied to the stored value of block 522 and the value of the Working set A message attribute in question, as yet a further delimiter.

For example, criteria code 706 may identify message size, the stored value of block 522 might, for example, correspond to 1K byte and Logic function 710 could be Less-or-Equal (i.e., less than or equal to). By way of example and not by way of limitation, this entry seeks to delimit Working set A to those entries where the size of the transmitted message was less than or equal to 1K byte.

When the outcome of the application at blocks 526–528 identifies one or more working set A entries, flow proceeds from block 528 to block 530 where the identified entries are maintained within Working set A. In accordance, all working set A entries that are not identified during blocks 526–528 are removed from Working set A.

When the outcome of the application at blocks 526–528 does not identify a Working set A entry, flow proceeds from block 528 to block 532 where a confidence level is set to low. Such setting indicates that the criteria employed to delimit Working set A was not helpful.

From blocks 530 and 532, flow proceeds to block 534 where a check is performed to determine whether more criteria are to be evaluated. This information is derived from the Number of Criteria field 704 of FIG. 7. According to the preferred embodiment fields 706, 708 and 710 of FIG. 7 are repeatable a number of times N, where N equals the number of criteria set forth in field 704. Assuming more criteria require evaluation, flow branches back to block 514 where the process repeats until no more criteria require evaluation. When no more criteria are to be evaluated, flow proceeds from block 534 to block 536 where the preference values associated with the entries within working set A are employed during the transmission of the message 300.

After filtering, if Working set A comprises more than one entry, it will be appreciated by those skilled in the art that any one such record may suffice. It is, further anticipated by the present invention that final preference determination may be derived based upon the frequency of a preferences occurrence within working set via simple or weighted averages.

What is claimed is:

1. A method for communicating a message having attributes, said message attributes comprised of header, destination, status and payload information, to destinations within a communication system comprising the steps of:

determining the payload for communication;

selecting a list of one or more destinations, each destination having a set of preferences, each preference further having a default value;

determining a second set of values for at least some of the preferences within said list of one or more destinations; and utilizing at least the second set of preference values during the transmission of the message.

2. The method of claim 1 wherein the step of selecting a list of one or more destinations further comprises the step of addressing a destination.

3. The method of claim 1 wherein the step of determining a second set of values for at least some of the preference further comprises the steps of:

indexing a database via a key to retrieve a set of database entries, each entry having a set of preferences, each preference further having a value; and filtering the set of retrieved database entries to identify those entries exhibiting a predefined set of attributes.

4. The method of claim 3 wherein the key comprises a destination name.

5. The method of claim 3 wherein each database entry provides status about information communicated to or received from a destination.

6. The method of claim 5 wherein the status within each data base entry further comprises at least one of:

source status, destination status, time and date stamp status, message size status, message type indications, message content indications, error rate indications, transmission cost indications, elapsed time indications, security level indications.

7. The method of claim 3 wherein the step of filtering further comprises the steps of:

selecting a set of criteria, each criteria having an identifier, a value, and a qualifier; and comparing each criteria and value to an associated preference and value within each retrieved database entry, by the qualifier, to further delimit the database entries.

8. The method of claim 1 further comprising the step of:

utilizing at least the second set of preference values during processing of the communicated message by the one or more selected destinations.

9. The method of claim 1 wherein the set of preferences are selected from the group consisting of:

cost, time, security, quality, handling instructions, reporting options, and spectral efficiency.

10. A method for communicating a message having attributes, said attributes comprised of header, destination, status and payload information, from a source to destinations within a communication system comprising the steps of:

at the source, selecting a list of one or more destinations, each destination having a key and a set of preferences, each preference further having a default value;

indexing a database via the key to retrieve a set of historical database entries, each entry having a set of preferences, each preference further having a value;

filtering the set of retrieved database entries to identify a second set of values for at least some of the preferences within said list of one or more destinations exhibiting a predefined set of criteria;

utilizing at least the second set of preference values during the transmission of the message; and storing a record of the communication in the database for future indexing.

* * * * *